US008938166B2

(12) United States Patent
Roullot

(10) Patent No.: US 8,938,166 B2
(45) Date of Patent: Jan. 20, 2015

(54) SMART SMALL FORM-FACTOR PLUGGABLE TRANSCEIVER FOR DATA NETWORKS

(71) Applicant: Stéphan Roullot, L'Haÿ-les-Roses (FR)

(72) Inventor: Stéphan Roullot, L'Haÿ-les-Roses (FR)

(73) Assignee: Alcatel Lucent, Boulogne Billancourt (FR)

( * ) Notice: Subject to any disclaimer, the term of this patent is extended or adjusted under 35 U.S.C. 154(b) by 107 days.

(21) Appl. No.: 13/719,992

(22) Filed: Dec. 19, 2012

(65) Prior Publication Data

US 2014/0169785 A1 Jun. 19, 2014

(51) Int. Cl.
*H04B 10/00* (2013.01)
*H04B 10/40* (2013.01)

(52) U.S. Cl.
CPC ..................... *H04B 10/40* (2013.01)
USPC ............................ 398/37; 398/135

(58) Field of Classification Search
CPC ...................................... H04B 10/40
USPC .......................................... 398/135
See application file for complete search history.

(56) References Cited

U.S. PATENT DOCUMENTS

| 2005/0105910 | A1* | 5/2005 | Light | 398/137 |
| 2007/0147844 | A1* | 6/2007 | Harres | 398/135 |
| 2008/0298815 | A1* | 12/2008 | Khalouf et al. | 398/202 |
| 2012/0148241 | A1* | 6/2012 | Piehler et al. | 398/49 |

OTHER PUBLICATIONS

"Virtual Bridged Local Area Networks Amendment 5: Connectivity Fault Management;" IEEE Standard for Local and Metropolitan Area Networks; IEEE Computer Society; Sponsored by the LAN/MAN Standards Committee; IEEE Std 802.1ag™-2007; Dec. 17, 2007; pp. 1-260.
"Virtual Bridged Local Area Networks Amendment 11: Two-Port Media Access Control (MAC) Relay;" IEEE Standard For Local and Metropolitan Area Networks; IEEE Computer Society; Sponsored by the LAN/MAN Standards Committee; IEEE Std 802.1aj™-2009; Dec. 30, 2009; pp. 1-99.

(Continued)

*Primary Examiner* — Danny Leung
(74) *Attorney, Agent, or Firm* — Mendelsohn, Drucker & Dunleavy, P.C.; Edward J. Meisarosh; Steve Mendelsohn

(57) ABSTRACT

In one embodiment, a smart small form-factor pluggable (SSFP) transceiver—compatible with SFP size, power, and interconnection standards—includes an optical transceiver, an electrical connector, a protocol processing engine, and a CPU. The SSFP transceiver is configured for use at a client site having no network interface device (NID). The SSFP transceiver (1) mates to a client's network device at an electrical interface within the network device and (2) connects to a network provider's central office (CO) node via an optical cable at an optical interface. The SSFP transceiver is configured to (1) be powered by the network device, (2) power-up upon mating with the network device, (3) be configured by a remote management agent (RMA) of the network provider for communication with the provider network, (4) respond to/generate Operation, Administration, and Management (OAM) messages from/for the CO node, and (5) provide OAM demarcation functions of a conventional NID.

22 Claims, 3 Drawing Sheets

(56) References Cited

OTHER PUBLICATIONS

"Part 3: Carrier Sense Multiple Access With Collision Detection (CSMA/CD) Access Method and Physical Layer Sepcifications; Amendment: Media Access Control Parameters, Physical layers, and Management Parameters for Subscriber Access Networks;" IEEE Standard for Information Technology—Telecommunications and Information Exchange Between Systems; IEEE Computer Society; Sponsored by the LAN/MAN Standards Committee; IEEE Std 802.3ah™-2004; Sep. 7, 2004; pp. 1-640.

"Part 3: Carrier Sense Multiple Access With Collision Detection (CSMA/CD) Access Method and Physical Layer Sepcifications; Section Five;" IEEE Standard for Information Technology—Telecommunications and Information Exchange Between Systems; IEEE Computer Society; Sponsored by the LAN/MAN Standards Committee; Revision of IEEE Std 802.3; 2008; pp. 1-615.

"Accendian Networks NanoNID;" Accedian Networks; Accedian.com; Oct. 2012—rev 1.0; pp. 1-2.

"SFF Committee INF-8074i Specification for SFP (Small Formfactor Pluggable) Transceiver"; Rev 1.0; May 12, 2001; pp. 1-38.

"Series G: Transmission Systems and Media, Digital Systems and Networks, Series Y: Global Information Infrastructure, Internet Protocol Aspects and Next-Generation Networks;" ITU-T Recommendation G.8013/Y.1731; International Telecommunication Union; Jul. 2011; pp. 1-92.

"User Network Interface (UNI) Type 2 Implementation Agreement;" MEF Technical Specification MEF 20; The Metro Ethernet Forum; Jul. 2008; pp. 1-23.

"Latching Loopback Protocol and Functionality;" MEF Technical Specification MEF x.0; Ver. 0.14; The Metro Ethernet Forum; 2012; pp. 1-38.

"Series Y: Global Information Infrastructure, Internet Protocol Aspects and Next-Generation Networks;" ITU-T Recommendation Y.1564; International Communication Union; Mar. 2011; pp. 1-38.

"RAD to Unveil Unique Ethernet Demarcation SFP at Ethernet Expo Americas;" RAD Data Communications New Product Release; Rad Data Communications; Oct. 25, 2012; pp. 1-3.

\* cited by examiner

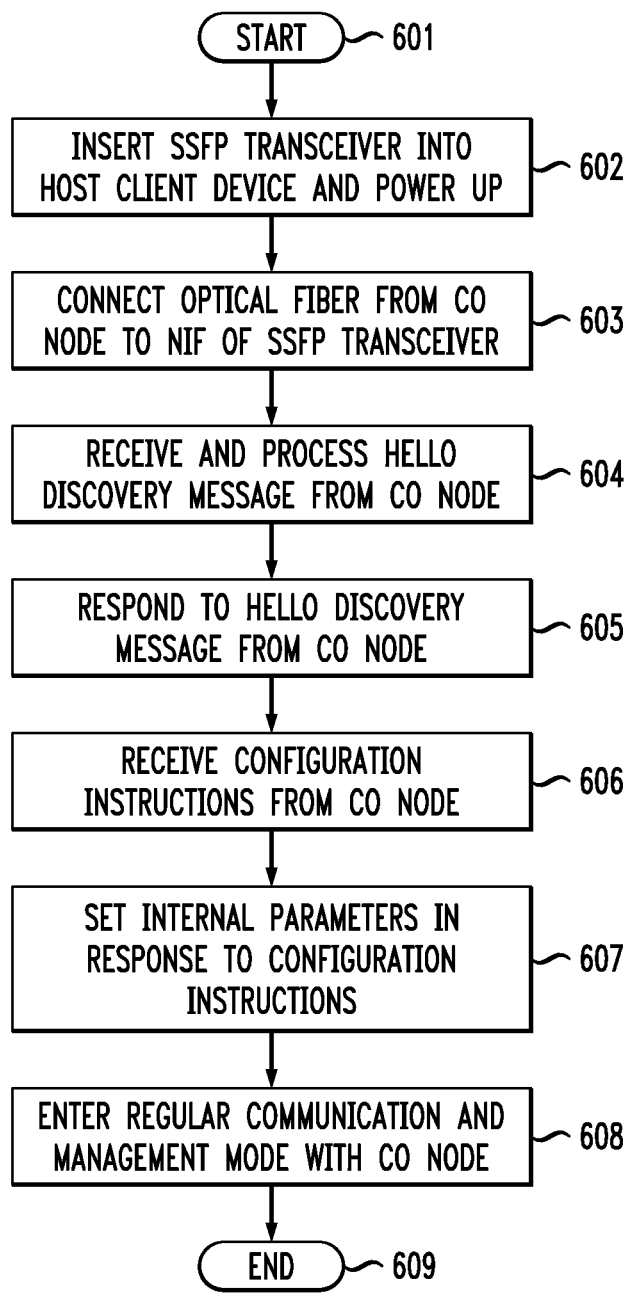

SMART SMALL FORM-FACTOR PLUGGABLE TRANSCEIVER FOR DATA NETWORKS

BACKGROUND

1. Field

The current disclosure relates to small form-factor pluggable (SFP) transceivers, and more specifically but not exclusively, to SFP transceivers used for connecting client-premises equipment to an optical data network.

2. Description of the Related Art

Optical data networks are used to provide high-speed and high-throughput data communication to clients. The backbone of an optical data network uses optical fibers, which carry light, to transmit data among network hubs and central offices of an optical-network provider's access network. The optical-network backbone connects to a client's premises via a metropolitan-access segment that uses a fiber optic cable from a proximate central office. The network segment from the central office to the client's premises is sometimes referred to as the first mile (as viewed from the client's perspective) or the last mile (as viewed from the provider's perspective)—although the actual distance typically ranges from dozens of meters up to a few dozen kilometers.

At the client premises, the optical fiber connects to a network interface device (NID) that (i) demarcates the boundary between the provider's access network—which is the provider's responsibility—and the client's local network—which is the client's responsibility—and (ii) provides interconnectivity and translation, as needed, between the provider's optical network and the client's optical equipment. In other words, a typical NID connects from a first type optical network suitable for medium-distance transmission to a second type optical network suitable for short-distance transmission. Note that (i) a NID is also known as a demarcation device and (ii) an access network is also known as a transport network. Note further that, in some fiber-optic network setups, one entity—a network provider—manages the physical fiber-optic network while a separate entity—a service provider—provides optical data services over that network to clients such as end users. In the latter type of setups, additional network devices might be required at the client premises because of the plurality of parties involved in the provision and use of the network services.

The logical processing performed internally by a NID is done electronically—as opposed to optically—using integrated circuit (IC) chips. Consequently, the NID performs optical-to-electrical (o/e) and electrical-to-optical (e/o) signal conversions in order to perform electronic processing while receiving and transmitting optical signals. These conversions are typically performed by SFP transceivers, which—as their name suggests—are small, pluggable devices that connect to an optical cable at a first connective interface and plug into corresponding receptacles, sometimes called cages, of an electronic device—such as a NID—connecting at a second connective interface. Industry-wide specifications for SFP transceivers are determined and provided by the SFF (Small Form Factor) Committee, an ad-hoc group of electronics industry participants. One such standard for SFP transceivers is INF-8074i (available at ftp://ftp.seagate.com/sff/INF-8074.PDF), incorporated herein by reference in its entirety.

FIG. 1 shows a simplified functional diagram of conventional SFP transceiver 100. SFP transceiver 100 comprises optical transceiver 101, controller 102, EEPROM (electronically erasable programmable read-only memory) 104, and electrical connector 103. Optical transceiver 101 connects to fiber optic cable 100a, which typically—in networking applications—includes two optical fibers, namely, a transmit fiber and a receive fiber. Note that, in some setups, fiber optic cable 100a includes only one optical fiber, which may be used to transmit and/or receive data. Fiber optic cable 100a may also be generically referred to as an optical link. Optical transceiver 101 converts (i) electrical signals provided by controller 102 and/or electrical connector 103 (via controller 102) into optical signals for provision to the transmit fiber of fiber-optic cable 100a and (ii) optical signals received from the receive fiber of fiber-optic cable 100a into electrical signals for provision to controller 102 and/or electrical connector 103. SFP transceiver is sometimes referred to as an optical network unit (ONU) because of its optical/electrical conversions.

Optical transceiver 101 connects to controller 102 via path 102a. Connector 103 connects to controller 102 via path 102b. Connector 103 is adapted to plug into a corresponding connector of a host electronic device (not shown) and communicate via signal path 100b. Controller 102 provides basic control functions for the operation of SFP transceiver 100 and interconnects the internal components of SFP transceiver 100. EEPROM 104, which is connected to controller 102 via path 104a, stores inventory data such as, for example, model name and serial number. The host typically comprises a serializer/deserializer (SerDes) for the conversion of parallel signals on the user-equipment side to/from serial signals used on the service-provider side. Path 100b also provides electrical power to SFP transceiver 100.

FIG. 2 shows typical optical-network segment 200 that includes central office (CO) node 201 connected to client device 202, having an optical interface and located at client site 203. Central office node 201—also known as a metro node—connects to NID 204—located at client site 203—via optical path 201a. NID 204 is a device provided, operated, and maintained by the service provider and, in addition to the NID functions described above, is used by the service provider to set up, monitor, and troubleshoot the connection from CO node 201 to client site 203. These operations may include (1) service activation, (2) operations, administration, and maintenance (OAM), (3) Quality of Service (QoS) management, (4) virtual local area network (VLAN) processing, and (5) synchronization distribution. OAM functions are used by the service provider to monitor service, troubleshoot problems, and localize faults, as well as measure performance to verify conformance to the service-level agreement (SLA) between the service provider and the client.

NID 204 is powered via a connection to a regular electrical power socket. Since the internal processing performed by NID 204 is performed electronically while communication to CO node 201 and client device 202 is performed optically, NID 204 uses two SFP transceivers, namely, SFP transceivers 205 and 206, which are substantially similar to SFP transceiver 100 of FIG. 1. SFP transceivers 205 and 206 are plugged into corresponding receptacles in NID 204. Note that an SFP-transceiver receptacle, such as the receptacles of NID 204, includes an electrical connector which makes direct physical contact with the electrical connector of the corresponding SFP transceiver when the SFP transceiver is plugged into the receptacle. SFP transceiver 205 connects, via optical fiber 201a, to CO node 201 and SFP transceiver 206 connects, via optical fiber 204a, to client device 202. NID 204 may include LEDs corresponding to SFP transceivers 205 and 206, which indicate, for example, whether the corresponding link is up or down, based on a determination made by NID 204.

The demarcation between the provider's network and the client's network is represented in FIG. 2 by dotted line 207. The physical port or interface that forms the boundary between the two networks is known as a user-network interface (UNI). The part of the network provider's equipment that performs and controls the UNI is sometimes designated as UNI-N while the part of the customer's equipment that performs UNI functions is sometimes designated as UNI-C. Standard features for UNIs are defined by the Metro Ethernet Forum (MEF). In network segment 200, the UNI would be where SFP transceiver 206 connects to optical cable 204a since optical cable 204a is the client's responsibility—as are SFP transceiver 208 and client device 202—while SFP transceiver 206 is the network provider's responsibility—as are NID 204, SFP transceiver 205, and optical cable 201a. Using SFP transceiver 206 and optical cable 204a, NID 204 provides an optical connection to client device 202. Client device 202 uses SFP transceiver 208, also similar to SFP transceiver 100 of FIG. 1, to connect to local optical fiber 204a and convert between optical and electrical signals. Client device 202 may be, for example, a network router connected to the client's local area network.

SUMMARY

One embodiment of the disclosure can be a pluggable device adapted to plug into a receptacle of a client network device. The pluggable device comprises (a) an optical transceiver configured to (i) optically connect to a provider network node via a first optical link, (ii) convert incoming downlink optical signals received from the network node via the first optical link into incoming downlink electrical signals, and (iii) convert outgoing uplink electrical signals into outgoing uplink optical signals for transmission to the network node via the first optical link, (b) an electrical connector configured to (i) electrically connect to the receptacle of the client network device, (ii) transmit outgoing downlink electrical signals to the client network device via the receptacle, and (iii) receive incoming uplink electrical signals from the client network device via the receptacle, and (c) a processing module configured to process one or more of (i) the incoming downlink electrical signals and (ii) the incoming uplink electrical signals to implement at least one operations, administration, and maintenance (OAM) function.

Another embodiment of the disclosure can be a provider network node configured to (a) optically connect to a client network device via (i) a first optical link and a (ii) pluggable device configured to plug into a receptacle of the client network device and (b) remotely manage the pluggable device via the first optical link. The pluggable device comprises (a) an optical transceiver configured to (i) optically connect to the provider network node via the first optical link, (ii) convert incoming downlink optical signals received from the network node via the first optical link into incoming downlink electrical signals, and (iii) convert outgoing uplink electrical signals into outgoing uplink optical signals for transmission to the network node via the first optical link, (b) an electrical connector configured to (i) electrically connect to the receptacle of the client network device, (ii) transmit outgoing downlink electrical signals to the client network device via the receptacle, and (iii) receive incoming uplink electrical signals from the client network device via the receptacle, and (c) a processing module configured to process one or more of (i) the incoming downlink electrical signals and (ii) the incoming uplink electrical signals to implement at least one operations, administration, and maintenance (OAM) function.

Yet another embodiment of the disclosure can be a method for a pluggable device comprising an optical transceiver, an electrical connector, and a processing module. The method comprises (a) the pluggable device automatically powering up in response to the pluggable device being plugged into a receptacle of a client network device, wherein the electrical connector is configured to (i) electrically connect to the receptacle, (ii) convert incoming downlink optical signals received from a network provider node via a first optical link into incoming downlink electrical signals, and (iii) convert outgoing uplink electrical signals into outgoing uplink optical signals for transmission to the network provider node via the first optical link, (b) the pluggable device receiving and processing a discovery message from the provider network node, after connection of the first optical link to the optical transceiver, wherein the optical transceiver is configured to (i) optically connect to the provider network node via the first optical link, (ii) convert incoming downlink optical signals received from the network node via the first optical link into incoming downlink electrical signals, and (iii) convert outgoing uplink electrical signals into outgoing uplink optical signals for transmission to the network node via the first optical link, (c) the pluggable device receiving one or more configuration instructions from the provider network node, and (d) the pluggable device setting one or more parameters of the pluggable device in response to the received one or more configuration instructions from the provider network node.

BRIEF DESCRIPTION OF THE DRAWINGS

Other aspects, features, and advantages of the disclosure will become more fully apparent from the following detailed description, the appended claims, and the accompanying drawings in which like reference numerals identify similar or identical elements.

FIG. 6 shows an exemplary plug-and-play procedure for the installation and configuration of the SSFP transceiver of FIG. 3 at a client site.

DETAILED DESCRIPTION

Figure 2:
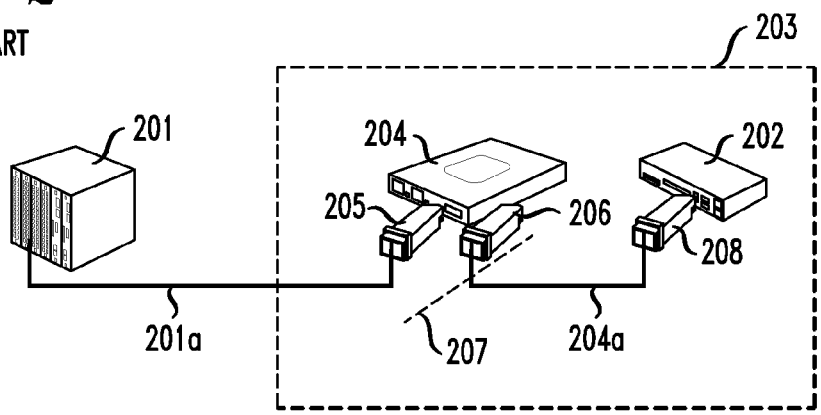
FIG. 2 shows typical optical-network segment that includes a central office connected to an end-user device.

Miniaturizing and integrating certain selected functions typically performed by a NID into a smart SFP (SSFP) transceiver may provide for a compact, low-power, relatively inexpensive device that would allow for the elimination of the NID from a client site and the reduction of the number of SFP transceivers used at the client site from three, such as SFP transceivers 205, 206, and 208 in FIG. 2, to one SSFP transceiver. The reduction of devices from three SFP transceivers and one NID to only one SSFP transceiver should reduce purchase, installation, and maintenance costs and increase the reliability of the optical-network system at the client site. In addition, the replacement of the NID and three SFP combination with a single smart SFP transceiver allows for the provision of fiber-optic connectivity to locations with limited space and/or electrical power outlets. This is possible because an SSFP transceiver—like a typical SFP transceiver—is mated to—and receives electrical power from—its host device and, consequently, does not require an additional power outlet or a significant volume of additional space.

Furthermore, an SSFP transceiver may provide various advanced features to locations where, otherwise, provision of such services would be impractical due to cost and/or space limitations. Among such advanced features is, for example, automatic setup and configuration of the SSFP transceiver upon connection to both the service provider's network and the client network device. Another possible benefit of the use of an SSFP transceiver instead of several prior-art devices is the elimination of a need for interoperability testing for an agglomeration of several prior-art devices, where the devices may have been procured from different vendors with potentially conflicting implementations of features. Note that not all features of a NID, such as NID 204 of FIG. 2, need or should be integrated into a smart SFP transceiver, since some of those features may (1) be unnecessary for a particular application and/or (2) require power or size expenditures, alone or in combination, that exceed what the smart SFP transceiver may practically provide.

Figure 3:
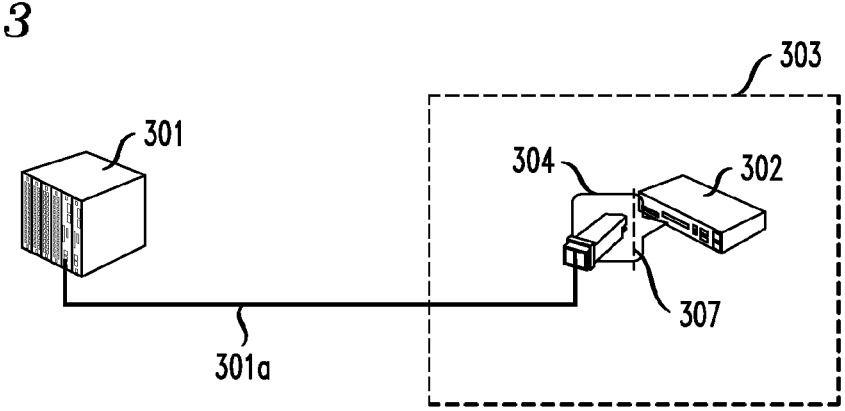
FIG. 3 shows an optical network segment in accordance with one embodiment of the present disclosure.

FIG. 3 shows optical network segment 300 in accordance with one embodiment of the present disclosure. Network segment 300 comprises central-office node 301 and client site 303 located at a central office of an optical-network-service provider. Central-office node 301 is similar to central-office node 201 of FIG. 2, but may be adapted to provide additional features that node 201 does not provide. Node 301 is connected to client site 303 by fiber-optic cable 301a. Fiber-optic cable 301a may comprise a single fiber or multiple (typically two) fibers, where a fiber in either configuration may be adapted for unidirectional and/or bidirectional transmission. Client site 303 comprises SSFP transceiver 304 and client network device 302, where SSFP transceiver 304 is mated to client network device 302. In other words, SSFP transceiver 304—owned and operated by the service provider—is physically inserted into a corresponding receptacle of client device 302—owned by the client, where the electrical connector of SSFP transceiver 304 makes direct physical and electrical contact with the electrical connector of the receptacle. Consequently, an agreement between the service provider and the client noting the use of SSFP transceiver 304 may be warranted.

Client device 302 is similar—and may be identical—to client device 202 of FIG. 2. Client device 302 does not need to be aware that SSFP transceiver 304 is a smart SFP transceiver and can interact with SSFP transceiver 304 as if SSFP transceiver 304 were conventional SFP transceiver 100 of FIG. 1. In other words, client device 202 may be used with SSFP transceiver 304 without any modification or software upgrade of client device 202. The above may be made possible by having the electrical connector side of SSFP transceiver 304 compliant with the above-mentioned SFF standards. Demarcation line 307, indicating the boundary between the network-provider's network and the client network, is shown as a dotted line. In the typical setup, where the network provider maintains and manages SSFP transceiver 304, the demarcation line is the electrical interface of SSFP transceiver 304, where SSFP transceiver 304 connects to client network device 302. Note that, during typical operation, this demarcation line is technically inside client network device 302 (indicated by the callout coming out of network device 302 and surrounding SSFP transceiver 304), which may warrant some modification of usual responsibility divisions between service provider and client.

At client location 303, optical cable 301a connects to smart SFP transceiver 304, which plugs into client network device 302. Client network device 302 may be an Ethernet local area network (LAN) switch, a packet-switched-network router, a Node B cellular transceiver, a digital subscriber line access multiplexer (DSLAM), or any other suitable type of client network device. Note that the client may be, for example, an end user of the service provider or, alternatively, a business unit of the service provider that happens to be an internal client of the service provider's transport service.

Smart SFP transceiver 304 combines selected functions previously performed by NID 204 and the three SFP transceivers—205, 206, and 208—of FIG. 2 in the physical form factor of a single SSFP transceiver. Other selected functions previously performed by NID 204 may, instead, be performed remotely by central-office node 301. The particular functions provided by, respectively, smart SFP transceiver 304 and central-office node 301 depend on the particular embodiment. In one embodiment, smart SFP transceiver 304 provides (1) physical and logical demarcation between the provider's network and the client's network and (2) media conversion to/from optical signaling from/to electrical signaling.

Figure 4:
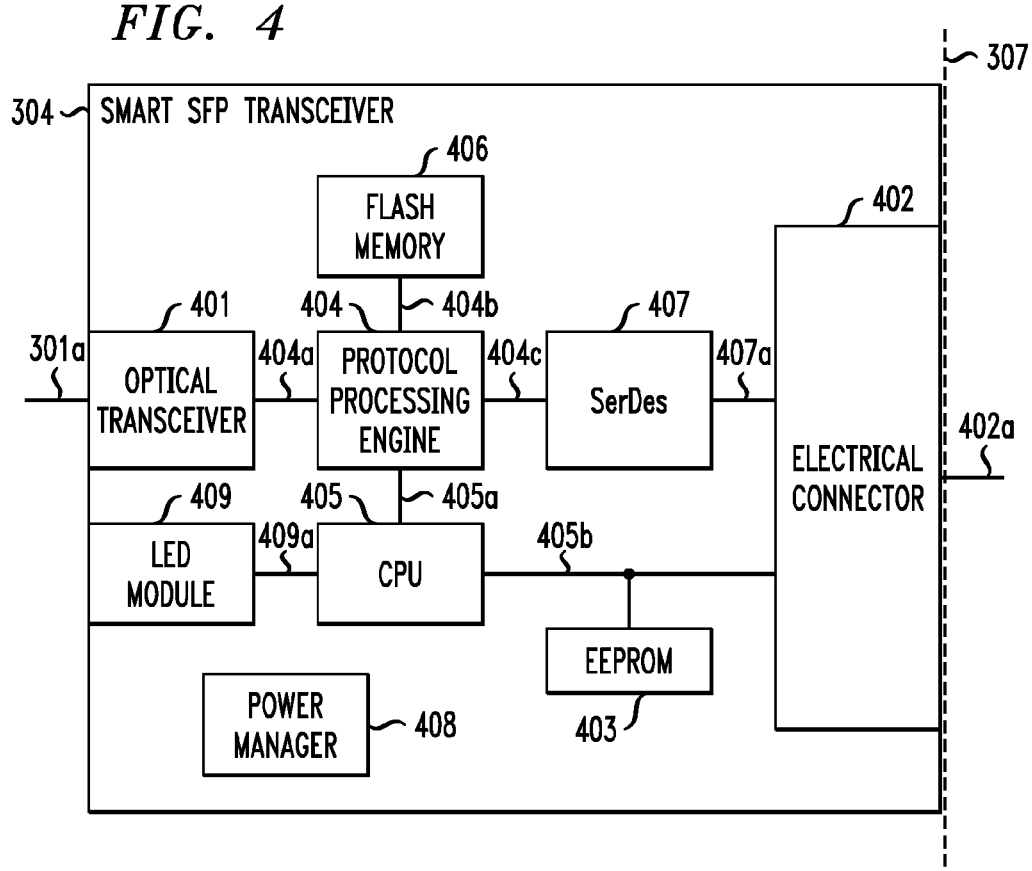
FIG. 4 shows a simplified block diagram of smart SFP (SSFP) transceiver DA in accordance with one embodiment of the present disclosure.

FIG. 4 shows a simplified block diagram of smart SFP transceiver 304 of FIG. 3 in accordance with one embodiment of the present disclosure. SSFP transceiver 304 is externally—in terms of size, dimensions, and interconnections—substantially the same as SFP transceiver 100 of FIG. 1. In other words, the mechanical packaging of SSFP transceiver 304 is substantially the same as that of SFP transceiver 100 and does not require a non-standard caging within client device 302. In other words, the dimensions and interconnections of SSFP transceiver 304 is make it compatible with industry standards. Paths 301a and 402a are substantially similar to the corresponding paths of FIG. 1—namely, paths 100a and 100b, respectively. In other words, path 301a represents an optical signal path as described above and path 402a represents an electronic signal path from a host device, such as client-network device 302 of FIG. 3. Demarcation line 307 is shown for the above-discussed typical setup.

SSFP transceiver 304 comprises optical transceiver 401, electrical connector 402, and EEPROM 403—which are similar to their counterparts in SFP transceiver 100, namely, optical transceiver 101, electrical connector 103, and EEPROM 104, respectively. SSFP transceiver 304 further comprises protocol processing engine 404, central processing unit (CPU) 405, flash memory 406, Serializer/Deserializer (SerDes) 407, power manager 408, and LED module 409. The functions of controller 102 of SFP transceiver 100—which are relatively limited and simple—are performed by protocol processing engine 404, which also implements additional functionality described elsewhere herein.

Protocol processing engine 404 connects to optical transceiver 401 via path 404a and to flash memory 406 via path 404b. Protocol processing engine 404 may be implemented, for example, as an application-specific integrated circuit (ASIC) or a field-programmable gate array (FPGA). CPU 405 may also be implemented, for example, as an ASIC or an FPGA. Note that two or more of the components of SSFP transceiver 304—such as, for example, protocol processing engine 404 and CPU 405—may be integrated on a single ASIC or FPGA chip.

Figure 1:
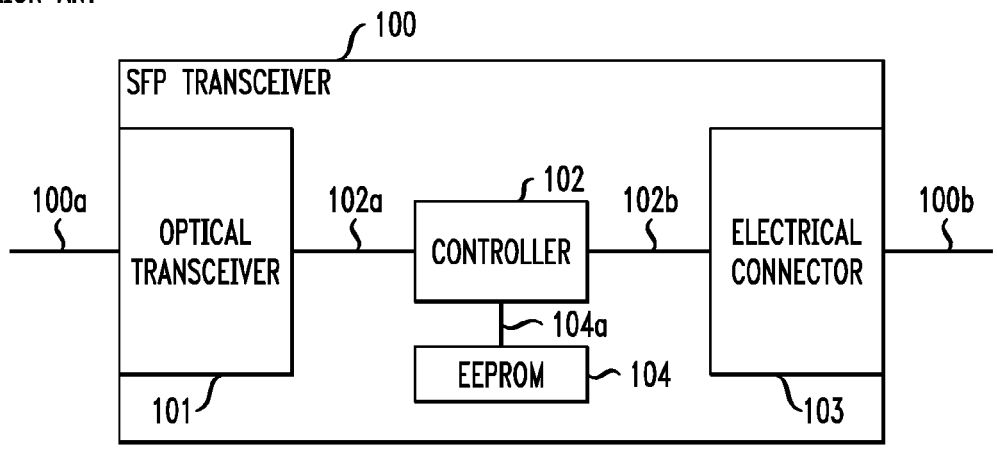
FIG. 1 shows a simplified functional diagram of a prior-art SFP transceiver.

CPU 405 and protocol processing engine 404 allow SSFP transceiver 304 to perform a variety of advanced functions that are not available from SFP transceiver 100 of FIG. 1. Examples of these advanced features are provided below. The functions provided by—as well as the particular circuitry of—CPU 405, as well as other components of SSFP transceiver 304, may vary depending on implementation and/or on the type of network in which SSFP transceiver 304 is used. CPU 405 connects to protocol processing engine 404 via path 405a. CPU 405 connects to electrical connector 402 and EEPROM 403 via path 405b. SerDes 407 connects to protocol processing engine 404 via path 404c and to electrical connector 402 via path 407a.

A SerDes, such as SerDes 407, converts between serially transmitted data and data transmitted in parallel. In SSFP transceiver 304, path 404c transmits data serially, while path 407a represents a plurality of parallel interfaces between SerDes 407 and electrical connector 402. Flash memory 406 is a rewritable non-volatile memory that is used by CPU 405 in the provision of one or more SSFP transceiver features.

Power manager 408 monitors power usage by components of SSFP transceiver 304. Power manager 408 also performs DC/DC voltage conversion from the voltage level provided via electrical connector 402 to the voltage level used by components such as protocol processing engine 404. CPU 405 and protocol processing engine 404 operate to keep the electrical power usage by SSFP transceiver 304 at or below a predetermined level, such as, for example, 1.5 watts—which complies with the limits specified by the above-noted SFF specification for SFP transceivers.

LED module 409 is connected to CPU 405 via path 409a and comprises one or more light-emitting diodes (LEDs)—in one or more corresponding colors—that may be used to indicate various statuses for SSFP transceiver 304. LED module 409 might simply replicate statuses previously determined and provided by a host device such as NID 204 of FIG. 2—e.g., link up/down status. LED module 409 might also indicate any one of a plurality of other statuses determined by SSFP transceiver 304, such as power-up status, whether a particular service is active, or if a particular set of conditions has been met. Note that LED module 409 is an optional module for SSFP transceiver 304, and some implementations of SSFP transceiver 304 do not include an LED module. In one implementation, optical transceiver 401 (i) has a single optical port for a single optical fiber and (ii) comprises LED module 409. In one alternative implementation, optical transceiver 401 (i) has two optical ports for two corresponding optical fibers and (ii) does not include an LED module.

In one implementation, SSFP transceiver 304 is used to provide Ethernet in the First Mile (EFM) Link OAM, as described in Clause 57 of Part 3 of IEEE Standard 802.3 (available from the IEEE at http://standards.ieee.org/about/get/802/802.3.html), incorporated herein by reference in its entirety. In the EFM implementation, central-office node 301 implements EFM active-side functions, such as sending EFM OAM packets. SSFP transceiver 304, on the other hand, implements EFM passive-side functions, such as receiving and responding to EFM OAM packets received from central-office node 301. Additional exemplary EFM functions that may be performed by SSFP transceiver 304 include: (1) responding to OAM discovery messages, as described elsewhere herein, (2) participation in the detection of link connectivity, (3) providing loopback support—i.e., enabling or disabling loopback in response to corresponding commands from the active end, (4) event notifications for particular system events, and (5) providing "dying gasp" notification, which may provide diagnostic information to CO node 301 upon an unexpected power failure affecting SSFP transceiver 304. These OAM features are further described, for example, in the above-referenced 802.3ah standard.

In another implementation, SSFP transceiver 304 is used to provide continuity fault management (CFM) Service OAM, as described in IEEE Std. 802.1ag-2007 (available at http://standards.ieee.org/findstds/standard/802.1ag-2007.html), incorporated herein by reference in its entirety. Note that these standards have been incorporated into IEEE Std. 802.1-2011 as Clauses 18-22. Note that the IEEE Std. 802.1ag-2007 CFM standard is substantially similar to a subset of ITU-T (International Telecommunication Union—Telecommunication Standardization Sector) Recommendation Y.1731 (available at http://www.itu.int/rec/T-REC-Y.1731/en), incorporated herein by reference in its entirety. Note that ITU-T Y.1731 provides CFM with additional fault management and performance management (PM) functions. Note further that these standards are also referenced in Metro Ethernet Forum (MEF) Service OAM specifications.

In the CFM embodiment, which implements IEEE Std. 802.1ag-2007 and/or ITU-T Y.1731 features, SSFP transceiver 304 implements various CFM and PM functions. These CFM and PM functions may include: sending continuity check messages (CCMs); responding to loopback (LB) messages; providing remote defect indication (RDI), performance management functions—including loss measurement (LM), synthetic LM (SLM), and delay measurement (DM); and remote configuration by a remote management agent (RMA) of MEG end-point (MEP) parameters, such as, for example, MEG level, MEG ID, MEP direction, MEP ID local, MEP ID remote, MEP enable, CCM enable, CCM interval, LM message (LMM) interval, DM message (DMM) interval, SLM interval, LB enable, and any other configurable parameter used by ITU-T Y.1731 and/or IEEE Std. 802.1ag-2007. Note that RMAs are described in further detail below.

In one embodiment, SSFP transceiver 304 supports the performance of Ethernet service activation, implemented in accordance with at least one of (i) ITU-T Recommendation Y.1564 (available at http://www.itu.int/rec/T-REC-Y.1564-201103-I/en), incorporated herein by reference in its entirety; and (ii) MEF Latching Loopback protocol, described in the MEF Technical Specification for Latching Loopback Protocol and Functionality.

In certain implementations of the disclosure, such as any of the ones described herein, SSFP transceiver 304 implements two-port media access control (MAC) relay (TPMR) functionality, as described in IEEE Std. 802.1aj (available at http://www.ieee.org.tr/findstds/standard/802.1aj-2009.html), incorporated herein by reference in its entirety. SSFP transceiver 304 functions as a TPMR bridge with two ports: a customer interface (CIF)—namely, electrical connector 402 and a network interface (NIF)—namely, optical transceiver 401. The bridging function is transparent to at-least-some Ethernet layer 2 (L2) control protocols. The bridging function is also transparent to Ethernet virtual local-area network (VLAN) protocol. Note that Ethernet quality of service (QoS) functionality might be excluded.

In TPMR implementations, SSFP transceiver 304 includes Ethernet-port Performance Monitoring (PM) counters for either or both the customer interface (CIF) and the network interface (NIF). The PM counters may count the numbers of, among others, (i) incoming error-free frames and octets, (ii) incoming frames with errors—due to, for example, frame check sequence (FCS) errors or frame length errors, (iii) frame drops—due to, for example, buffer overflow, and (iv) outgoing frames and octets. In addition, PM counters for the NIF may count (i) near-end symbols with errors and/or (ii) frames with errors. The various counter values may be retrieved and/or reset remotely by an RMA, as described below, located at CO node 301.

In one implementation of the disclosure, such as any of the ones described herein, SSFP transceiver 304 may include a Digital Diagnostics Monitor (DDM), which collects and maintains DDM statistics, which provide physical-layer data for the SSFP. The DDM allows for remote monitoring—by, for example, CO node 301 of FIG. 3—of various physical-layer characteristics for SSFP transceiver 304, such as transmit power, temperatures, and voltage levels.

Figure 5:
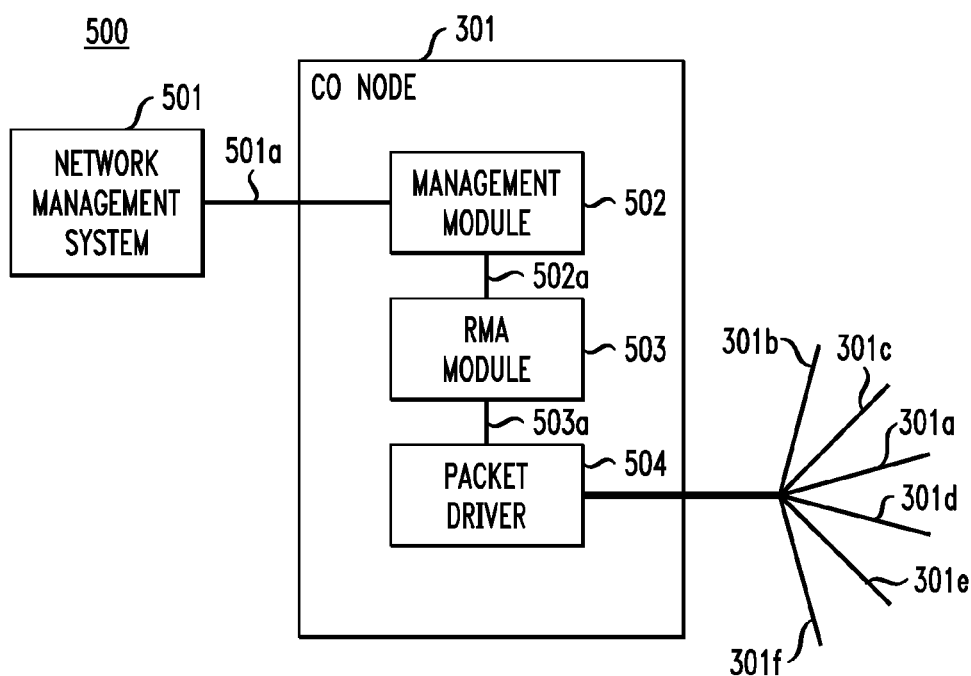
FIG. 5 shows a simplified block diagram of a segment of a provider network in accordance with one embodiment of the disclosure.

FIG. 5 shows a simplified block diagram of segment 500 of a provider network in accordance with one embodiment of the disclosure. Segment 500 comprises Network Management System (NMS) 501 connected to CO node 301 of FIG. 3. NMS 501, as the name suggests, is a management system for the provider's network and may be connected to a plurality of central office nodes, such as CO node 301. CO node 301 includes management module 502—which connects to NMS 501 via path 501a, RMA module 503—which is connected to management module 502 via path 502a, and packet driver 504—which connects to RMA module 503 via path 503a.

Management module 502 uses standard protocols—such as, for example, simple network management protocol (SNMP)—to send and receive network management information and commands. Management module 502 functions as an intermediary and interface between NMS 501 and RMA module 503. RMA module 503 provides the proxy remote management features described elsewhere herein. Packet driver 504 connects CO node 301 to one or more SSFP transceivers, such as SSFP transceiver 304, at client sites, such as client site 303. Packet driver 504 may be implemented, for example, as an application programming interface (API) for an Ethernet switch. RMA module 503 controls packet driver 504 to modify—as needed—data packets handled by packet driver 504. Packet driver 504 is shown connected to an exemplary plurality of SSFP transceivers (not shown) via respective paths 301a, 301b, 301c, 301d, 301e, and 301f. Note that intermediary network elements—such as, for example, network nodes—may be included in the physical path between CO node 301 and one or more of the SSFP transceivers to which it is connected, but these elements transparently forward the management data packets between CO node 301 and the one or more SSFP transceivers. Also note that CO node 301 may be connected to only one SSFP transceiver.

Note that, while NID 204 of FIG. 2 has its own IP (internet protocol) address and operates as a separate network element (NE), SSFP transceiver 304 does not, in this implementation, have its own IP address and appears to NMS 501 and CO node 301 as a remote port extender for a client port of CO node 301—which is a port of packet driver 504 of FIG. 5—and not as a separate NE with its own IP address. Note further, that CO node 301 may manage SSFP transceiver 304 using a lightweight protocol—i.e., a protocol that is simpler than the typical protocol for remotely managing a NID, such as SNMP over Ethernet or SNMP over IP over Ethernet—on a remote-management channel separate from a data communication channel used for data transmission. As would be appreciated by a person of ordinary skill in the art, many particular implementations of a management channel and a lightweight management protocol that is simple, reliable, and consumes relatively little bandwidth may be used. Note that the remote management may include automatic setup of SSFP transceiver 304 by CO node 301 during installation of SSFP transceiver 304 at client site 303.

FIG. 6 shows exemplary auto-setup procedure 600 for the installation and configuration of SSFP transceiver 304 of FIG. 3 at client site 303. Procedure 600 starts at step 601. SSFP transceiver 304 is plugged into a host client device, such as client network device 302, which provides electrical power to SSFP transceiver 304 via the customer interface (CIF) of SSFP transceiver 304, which allows SSFP transceiver 304 to automatically power up (step 602). Upon initial power up—in other words, even before any configuration by CO node 301—select features of SSFP transceiver 304 become available, such as, for example, Link OAM functionality and communication. Link OAM monitors and manages link-layer operations and allows for, e.g., network-element discovery, critical-event reporting, event notification, and loopback. Optical cable 301a, which is already connected to CO node 301, is then connected to the network interface (NIF) of SSFP transceiver 304 (step 603). SSFP transceiver 304 then receives and processes a so-called "hello" discovery message from CO node 301 (step 604). CO node 301 sends out "hello" discovery message intermittently on ports that have been configured to implement the RMA functionality described herein and to connect to an SSFP transceiver, have optic fibers connected, but do not have an active link up. In response to the receipt of the "hello" discovery message, SSFP transceiver 304 sends a response discovery message to CO node 301 (step 605).

SSFP transceiver 304 then receives configuration instructions from CO node 301 (step 606). The configuration instructions may be received in several packets as part of a back-and-forth configuration communication between SSFP transceiver 304 and CO node 301. SSFP transceiver 304 sets one or more internal parameter values in response to the configuration instructions received from CO node 301 (step 607). The configuration parameters may set up, for example, CFM and/or EFM parameters on SSFP transceiver 304. After the configuration is completed, SSFP transceiver 304 and CO node 301 enter regular communication and management mode (step 608) and auto-setup procedure 600 terminates (step 609). Regular communication and management mode includes management, as needed, of SSFP transceiver 304 by CO node 301. Regular management—also known as operational service phase—may include, for example, alarm reporting, fault localization, on-demand performance tests, and ongoing measurement of throughput, frame loss, and frame delay. Note that, as part of the configuration and/or regular communication processes, SSFP transceiver 304 may provide status and/or trouble information visible to a technician installing or inspecting SSFP transceiver 304 by signaling with one or more of the LEDs of LED module 409.

In one implementation of the disclosure, such as any of the ones described herein, SSFP transceiver 304 may include an Ethernet equipment clock (EEC) (not shown), which may be used to provide frequency synchronization distribution in the downstream direction—i.e., from the NIF to the CIF, where the EEC is compatible with the Synchronous Ethernet (SyncE) standard. The frequency distribution allows for the synchronization of the EEC frequency to a network clock based on a clock signal recovered at the NIF.

An embodiment of the disclosure has been described wherein NMS 501 of FIG. 5 is external to CO node 301. In some alternative embodiments, NMS 501 is within CO node 301. It should be noted that NMS 501 may connect to a plurality of central-office nodes regardless of whether NMS 501 is within or external to CO node 301.

Embodiments of the invention have been described where service monitoring of the link between the network provider and client site 303 of FIG. 3 is performed by CO node 301. It should be noted that SSFP transceiver 304 may also provide monitoring information to client equipment, such as, for example, client network device 302. This information may be provided via electrical connector 402 of FIG. 4.

Embodiments of the invention have been described comprising flash memory and EEPROM modules. It should be noted that other types of non-volatile memory may be used instead of either flash memory or EEPROM.

Embodiments of the invention have been described comprising a CPU and a protocol processing engine. A combination of a CPU and a protocol processing engine in an implementation may be referred to as a processing module.

References herein to the verb "to set" and its variations in reference to values of fields do not necessarily require an active step and may include leaving a field value unchanged if its previous value is the desired value. Setting a value may nevertheless include performing an active step even if the previous or default value is the desired value.

As used herein in reference to data transfers between entities in the same device, and unless otherwise specified, the terms "receive" and its variants can refer to receipt of the actual data, or the receipt of one or more pointers to the actual data, wherein the receiving entity can access the actual data using the one or more pointers.

Exemplary embodiments have been described wherein particular entities (a.k.a. modules) perform particular functions. However, the particular functions may be performed by any suitable entity and are not restricted to being performed by the particular entities named in the exemplary embodiments.

Exemplary embodiments have been described with data flows between entities in particular directions. Such data flows do not preclude data flows in the reverse direction on the same path or on alternative paths that have not been shown or described. Paths that have been drawn as bidirectional do not have to be used to pass data in both directions.

References herein to the verb "to generate" and its variants in reference to information or data do not necessarily require the creation and/or storage of new instances of that information. The generation of information could be accomplished by identifying an accessible location of that information. The generation of information could also be accomplished by having an algorithm for obtaining that information from accessible other information.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The term "nonvolatile memory," as used herein, refers to any type of memory that substantially retains its stored contents after disconnection from its power supply, i.e., the stored contents can be retrieved after reconnecting the nonvolatile memory to a power supply. Examples of nonvolatile memory include, but are not necessarily limited to (i) fuse/antifuse devices such as OTP memory and PROM, (ii) charge-storing devices such as EPROM and EEPROM and flash ROM, (iii) magnetic media devices such as hard drives and tapes, and (iv) optical, opto-electrical, and opto-magnetic media such as CDs and DVDs.

The present invention may be implemented as circuit-based systems, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. The terms "directly coupled," "directly connected," etc., imply that the connected elements are either contiguous or connected via a conductor for the transferred energy.

The use of figure numbers and/or figure reference labels in the claims is intended to identify one or more possible embodiments of the claimed subject matter in order to facilitate the interpretation of the claims. Such use is not to be construed as limiting the scope of those claims to the embodiments shown in the corresponding figures.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

I claim:

1. A pluggable device adapted to plug into a receptacle of a client network device, the pluggable device comprising:
    an optical transceiver configured to (i) optically connect to a provider network node via a first optical link, (ii) convert incoming downlink optical signals received from the network node via the first optical link into incoming downlink electrical signals, and (iii) convert outgoing uplink electrical signals into outgoing uplink optical signals for transmission to the network node via the first optical link;
    an electrical connector configured to (i) electrically connect to the receptacle of the client network device, (ii) transmit outgoing downlink electrical signals to the client network device via the receptacle, and (iii) receive incoming uplink electrical signals from the client network device via the receptacle; and
    a processing module configured to process one or more of (i) the incoming downlink electrical signals and (ii) the incoming uplink electrical signals to implement at least one operations, administration, and maintenance (OAM) function, wherein:
        the provider network node is part of a provider network;
        the client network device is part of a client network; and
        the electrical connector establishes a network demarcation boundary between the provider network and the client network.

2. The device of claim 1, wherein the pluggable device is configured to connect the provider network node and the client network device without requiring an intervening conventional network interface device (NID) to perform the OAM function.

3. The device of claim 1, wherein the pluggable device is a small form-factor pluggable (SFP) transceiver compatible with the Small Form Factor (SFF) Committee standards for SFP transceivers.

4. The device of claim 1, further comprising a light-emitting-diode (LED) module having at least one LED, wherein the processing module is configured to indicate one or more statuses of the device using the LED module.

5. The device of claim 1, wherein the provider network node is part of an optical network managed in accordance with Ethernet in the First Mile (EFM) Link OAM.

6. The device of claim 5, wherein the device is configured to receive and respond to EFM OAM messages received from the provider network node via the first optical link.

7. The device of claim 1, wherein the provider network node is part of an optical network managed in accordance with Ethernet Continuity Fault Management (CFM) Service OAM.

8. The device of claim 7, wherein the device is configured to receive and respond to CFM messages received from the provider network node via the first optical link.

9. The device of claim 1, wherein:
    the device is configured to implement two-port media access control (MAC) relay (TPMR) functionality;
    the electrical connector functions as a TPMR customer interface (CIF); and
    the optical transceiver functions as a TPMR network interface (NIF).

10. The device of claim 1, wherein:
    the device is configured to collect Digital Diagnostics Monitor (DDM) statistics;
    the DDM statistics provide physical-layer data for the device.

11. The device of claim 1, wherein the device is configured to be automatically set up by the provider network node upon mating to the receptacle of the client network device.

12. The device of claim 1, wherein the device is configured to automatically power up upon mating to the receptacle of the client network device.

13. The device of claim 1, wherein the device is configured to be remotely managed by the provider network node via the first optical link.

14. The device of claim 1, wherein the device is configured to be remotely managed by the provider network node via the first optical link without the device having an Internet Protocol (IP) address.

15. The device of claim 1, further comprising an Ethernet equipment clock (EEC) configured to synchronize the processing module to a frequency of the provider network node.

16. A provider network node configured to:
    optically connect to a client network device via (i) a first optical link and a (ii) pluggable device configured to plug into a receptacle of the client network device; and
    remotely manage the pluggable device via the first optical link, wherein:
        the network node comprises a remote management agent (RMA) configured to remotely manage the pluggable device; and
        the pluggable device comprises:
            an optical transceiver configured to (i) optically connect to the provider network node via the first optical link, (ii) convert incoming downlink optical signals received from the network node via the first optical link into incoming downlink electrical signals, and (iii) convert outgoing uplink electrical signals into outgoing uplink optical signals for transmission to the network node via the first optical link;
            an electrical connector configured to (i) electrically connect to the receptacle of the client network device, (ii) transmit outgoing downlink electrical signals to the client network device via the receptacle, and (iii) receive incoming uplink electrical signals from the client network device via the receptacle; and
            a processing module configured to process one or more of (i) the incoming downlink electrical signals and (ii) the incoming uplink electrical signals to implement at least one operations, administration, and maintenance (OAM) function.

17. A method for a pluggable device comprising an optical transceiver, an electrical connector, and a processing module, the method comprising:
    the pluggable device automatically powering up in response to the pluggable device being plugged into a receptacle of a client network device, wherein the electrical connector is configured to (i) electrically connect to the receptacle, (ii) convert incoming downlink optical signals received from a network provider node via a first optical link into incoming downlink electrical signals, and (iii) convert outgoing uplink electrical signals into outgoing uplink optical signals for transmission to the network provider node via the first optical link;
    the pluggable device receiving and processing a discovery message from the provider network node, after connection of the first optical link to the optical transceiver, wherein the optical transceiver is configured to (i) optically connect to the provider network node via the first optical link, (ii) convert incoming downlink optical signals received from the network node via the first optical link into incoming downlink electrical signals, and (iii) convert outgoing uplink electrical signals into outgoing uplink optical signals for transmission to the network node via the first optical link;

the pluggable device receiving one or more configuration instructions from the provider network node; and the pluggable device setting one or more parameters of the pluggable device in response to the received one or more configuration instructions from the provider network node.

18. The method of claim 17, further comprising the pluggable device then entering regular communication and management mode with the provider network node.

19. A pluggable device adapted to plug into a receptacle of a client network device, the pluggable device comprising:

an optical transceiver configured to (i) optically connect to a provider network node via a first optical link, (ii) convert incoming downlink optical signals received from the network node via the first optical link into incoming downlink electrical signals, and (iii) convert outgoing uplink electrical signals into outgoing uplink optical signals for transmission to the network node via the first optical link;

an electrical connector configured to (i) electrically connect to the receptacle of the client network device, (ii) transmit outgoing downlink electrical signals to the client network device via the receptacle, and (iii) receive incoming uplink electrical signals from the client network device via the receptacle; and a processing module configured to process one or more of (i) the incoming downlink electrical signals and (ii) the incoming uplink electrical signals to implement at least one operations, administration, and maintenance (OAM) function, wherein:

the device is configured to implement two-port media access control (MAC) relay (TPMR) functionality;

the electrical connector functions as a TPMR customer interface (CIF); and the optical transceiver functions as a TPMR network interface (NIF).

20. A pluggable device adapted to plug into a receptacle of a client network device, the pluggable device comprising:

an optical transceiver configured to (i) optically connect to a provider network node via a first optical link, (ii) convert incoming downlink optical signals received from the network node via the first optical link into incoming downlink electrical signals, and (iii) convert outgoing uplink electrical signals into outgoing uplink optical signals for transmission to the network node via the first optical link;

an electrical connector configured to (i) electrically connect to the receptacle of the client network device, (ii) transmit outgoing downlink electrical signals to the client network device via the receptacle, and (iii) receive incoming uplink electrical signals from the client network device via the receptacle; and a processing module configured to process one or more of (i) the incoming downlink electrical signals and (ii) the incoming uplink electrical signals to implement at least one operations, administration, and maintenance (OAM) function, wherein:

the device is configured to automatically power up upon mating to the receptacle of the client network device; and the device is configured to be automatically set up by the provider network node upon mating to the receptacle of the client network device.

21. A pluggable device adapted to plug into a receptacle of a client network device, the pluggable device comprising:

an optical transceiver configured to (i) optically connect to a provider network node via a first optical link, (ii) convert incoming downlink optical signals received from the network node via the first optical link into incoming downlink electrical signals, and (iii) convert outgoing uplink electrical signals into outgoing uplink optical signals for transmission to the network node via the first optical link;

an electrical connector configured to (i) electrically connect to the receptacle of the client network device, (ii) transmit outgoing downlink electrical signals to the client network device via the receptacle, and (iii) receive incoming uplink electrical signals from the client network device via the receptacle; and a processing module configured to process one or more of (i) the incoming downlink electrical signals and (ii) the incoming uplink electrical signals to implement at least one operations, administration, and maintenance (OAM) function, wherein the device is configured to be remotely managed by the provider network node via the first optical link without the device having an Internet Protocol (IP) address.

22. A pluggable device adapted to plug into a receptacle of a client network device, the pluggable device comprising:

an optical transceiver configured to (i) optically connect to a provider network node via a first optical link, (ii) convert incoming downlink optical signals received from the network node via the first optical link into incoming downlink electrical signals, and (iii) convert outgoing uplink electrical signals into outgoing uplink optical signals for transmission to the network node via the first optical link;

an electrical connector configured to (i) electrically connect to the receptacle of the client network device, (ii) transmit outgoing downlink electrical signals to the client network device via the receptacle, and (iii) receive incoming uplink electrical signals from the client network device via the receptacle;

a processing module configured to process one or more of (i) the incoming downlink electrical signals and (ii) the incoming uplink electrical signals to implement at least one operations, administration, and maintenance (OAM) function; and an Ethernet equipment clock (EEC) configured to synchronize the processing module to a frequency of the provider network node.

* * * * *